United States Patent [19]

Wood

[11] Patent Number: 4,473,978
[45] Date of Patent: Oct. 2, 1984

[54] POLLUTANT STORAGE SYSTEM

[76] Inventor: Donald D. Wood, Star Route, Waterford, Vt. 05848

[21] Appl. No.: 291,359

[22] Filed: Aug. 10, 1981

[51] Int. Cl.³ .......................... E02D 27/00; E04B 1/00
[52] U.S. Cl. ..................................... 52/169.8; 52/270; 264/31; 4/506; 4/513
[58] Field of Search ..................... 52/169.7, 169.6, 196, 52/192, 169.8, 300, 169.9, 236.1, 261, 262, 270; 4/506, 513; 405/286; 254/24; 264/31, 35, 36, 333; 249/33

[56] References Cited

U.S. PATENT DOCUMENTS

| | | | |
|---|---|---|---|
| 952,645 | 3/1910 | Smith | 405/286 |
| 3,564,791 | 2/1971 | Arp | 52/169.7 |
| 3,839,751 | 10/1974 | Bressler | 52/169.7 X |
| 3,934,277 | 1/1976 | Quirouette et al. | 52/169.7 X |
| 4,075,801 | 2/1978 | Alper et al. | 52/196 |
| 4,352,601 | 10/1982 | Valiga et al. | 52/169.7 X |

FOREIGN PATENT DOCUMENTS

| | | | |
|---|---|---|---|
| 1288999 | 2/1962 | France | 264/31 |
| 1574151 | 7/1969 | France | 52/169.7 |
| 2314987 | 1/1977 | France | 52/169.7 |
| 7906724 | 3/1981 | Netherlands | 52/196 |

Primary Examiner—John E. Murtagh
Assistant Examiner—Andrew J. Rudy
Attorney, Agent, or Firm—Thomas N. Tarrant

[57] ABSTRACT

A pollutant storage system that provides substantial wall strength with greatly reduced concrete mass. Reinforced concrete panels precast with a pattern of surface cavities and supported by precast reinforced concrete A-frames enclose a paved floor area.

8 Claims, 10 Drawing Figures

POLLUTANT STORAGE SYSTEM

BACKGROUND OF THE INVENTION

1. Field of the Invention

The present invention relates to storage facilities for pollutant materials and in particular to storage pits for manure that will prevent pollution of the adjacent land area.

2. Description of the Prior Art

Animal excreta has been valuable through the years for plant fertilizer. Storage prior to processing or spreading has been recognized as a pollution problem, however, so that storage facilities have to prevent leakage into the surrounding soil and water sources. Initial systems utilized large cisterns of massive concrete construction. The cost of the large amounts of concrete is a substantial problem for small farms.

SUMMARY OF THE INVENTION

Now, in accordance with the present invention, a pollutant storage system is provided that provides substantial wall strength with greatly reduced concrete mass. Reinforced concrete panels precast with a pattern of surface cavities and supported by precast reinforced concrete A-frames enclose a paved floor area.

DESCRIPTION OF THE PREFERRED EMBODIMENTS

Figure 1:
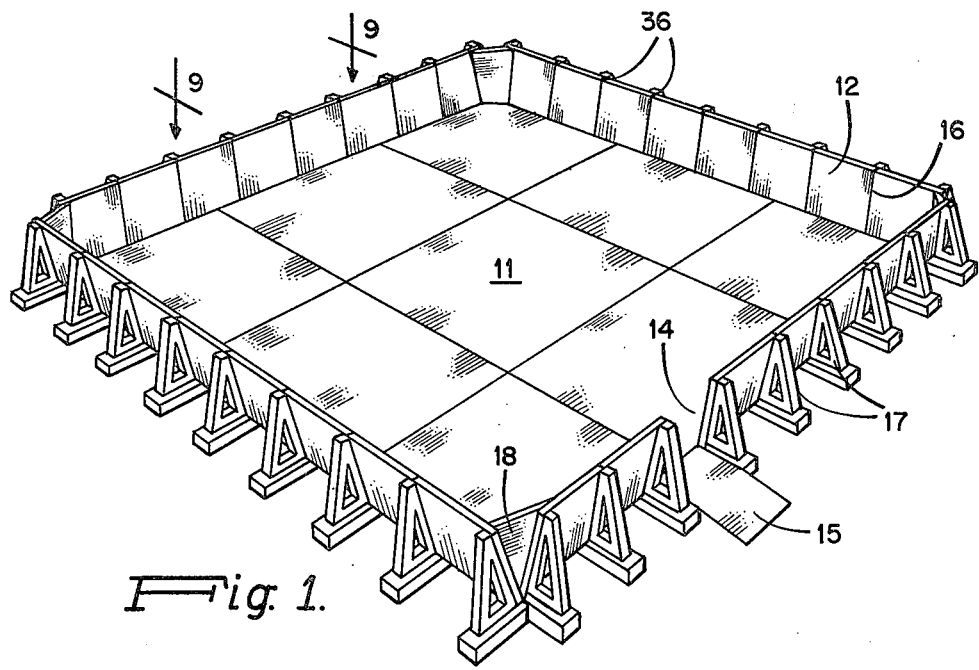
FIG. 1 is a view in perspective of a pollutant storage system according to the invention.

A principle purpose of the pollutant storage system of the invention is storage of manure which is used later as fertilizer. Two main variations of the storage system depend upon the consistency of the pollutant that is stored. Thus a relatively dry solid material is most easily deposited and removed by wheeled vehicles driven directly into the storage area whereas a liquid pollutant is more readily dumped, poured or pumped into the storage area over the top of the walls at the perimeter. FIG. 1 depicts a storage system 10 according to the invention as it would be for relatively dry storage. Modifications for liquid storage will be described with reference to FIGS. 9 and 10.

The storage system may be generally rectangular as depicted in FIG. 1. The shape is not important and polygonal shapes with various numbers of sides as well as curved constructions can be used. Floor area 11 must be relatively impermeable to the pollutant material and is suitably a paved area paved with concrete or other suitable paving material. The floor area may also be made into a suitable paving by the addition of chemical compositions or other suitable material for making the ground impermeable.

As depicted in FIG. 1, floor area 11 is paved with concrete having expansion grooves to reduce the liklihood of cracking. Floor area 11 is enclosed by wall panels 12 installed as modular units. Opening 14 is left for access and is provided with an apron 15 suitably of concrete for access of wheel vehicles. Wall panels 12 are supported at their junctures 16 by A-frame supports 17. In polygonal constructions where the main wall panels 12 are flat rectangular units, special trapidzoidal corner panels 18 are provided to seal the corners.

Figure 3:
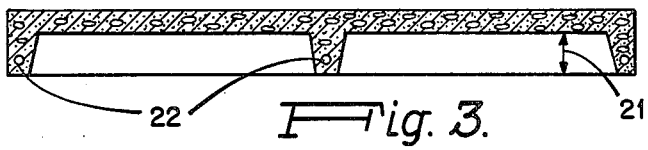
FIG. 3 is a cross section taken along 3—3 of FIG. 2
Figure 2:
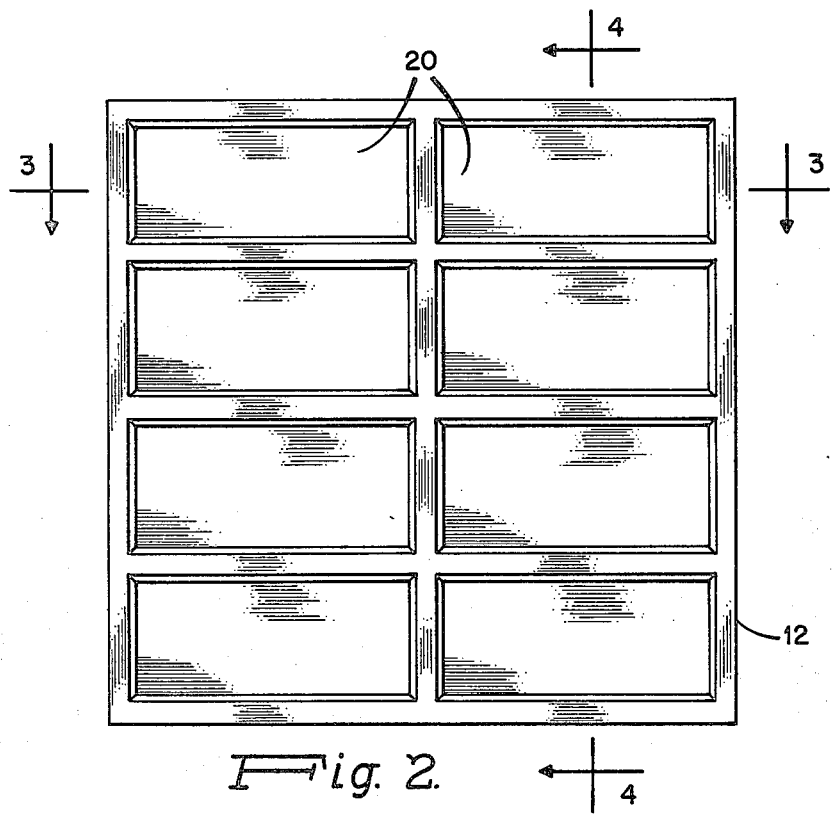
FIG. 2 is a rear elevation of a side panel unit for the system of FIG. 1.
Figure 4:
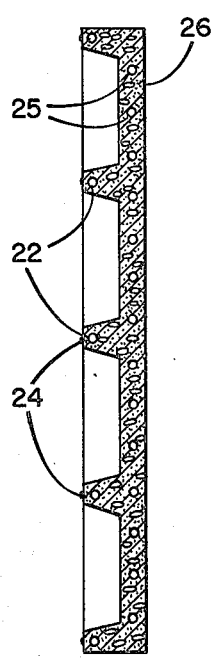
FIG. 4 is a cross section taken along 4—4 of FIG. 2

FIGS. 2, 3 and 4 depict one of wall panels 12. Wall panel 12 depicted in FIG. 2 has a plurality of surface cavities for reducing the mass of the panel while maintaining structural strength. Surface cavities 20 have a depth 21 that is slightly in excess of one-half the thickness. In one panel that has been used, the panel had a height of 8 feet, a thickness of $9\frac{1}{2}$ inches and surface cavities 20 provided to reduce the mass by approximately 50 percent. The exact design of the cavity pattern is not critical and can be made according to accepted engineering principles. In a preferred embodiment, panels 12 are precast in reinforced concrete with ferrous reinforcing rods 22 distributed for the required strength. As depicted in FIGS. 3 and 4 reinforcing rods 22 are provided near the land apexes 24 of the cavity patterns. Reinforcing rods 25 in the continuous solid portions 26 of wall panel 12 may take the form either of individual rods or a wire mesh.

Figure 5:
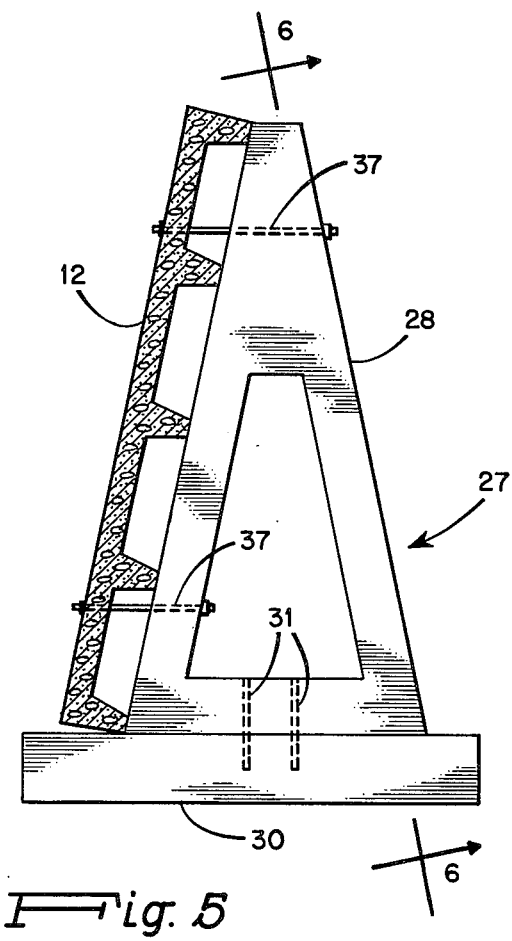
FIG. 5 is a side elevation of an A-frame support for the system of FIG. 1 showing the panel unit of FIG. 2 attached.
Figure 6:
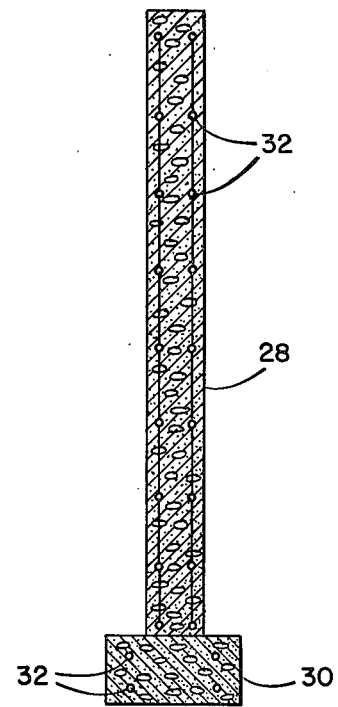
FIG. 6 is a rear elevation of the A-frame support of FIG. 5

As depicted in FIG. 5, each panel unit 12 is secured to an A-frame support 27 with the A-frame arranged at right angles to the plane of wall panels 12. A-frame support 27 has a precast A-portion which has been made with a 7 foot 10 inch height, a 4 foot base and an $8\frac{3}{4}$ inch apex. A thickness of 8 inches has been used. A-frame support 27 has a central aperature generally symetric with the exterior of the A-frame and in one used construction it has been made $2\frac{1}{2}$ feet wide at the bottom, 4 feet high and 8 inches wide at the top. "A" portion 28 is secured to a footing portion 30 with pins 31 or other fastening means. Footing 30 has been made 6 feet long, 20 inches wide and 10 inches deep extending beyond "A" portion 28 on all sides. Both footing 30 and "A" portion 28 are reinforced with reinforcing rods 32. Corner panels 18 (FIG. 7) are made in a trapezoidal configuration narrower at the bottom than at the top.

Figure 7:
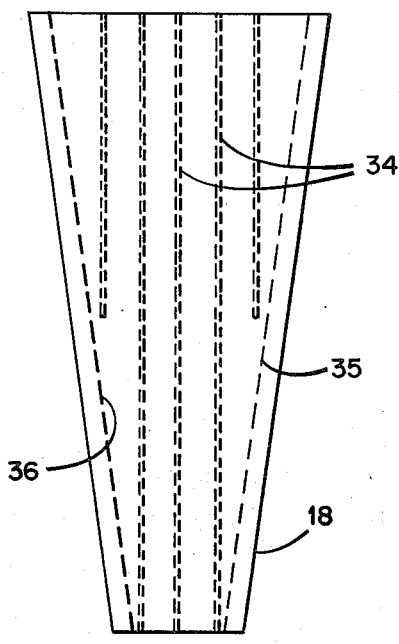
FIG. 7 is a front elevation of a corner panel unit for the system of FIG. 1
Figure 8:
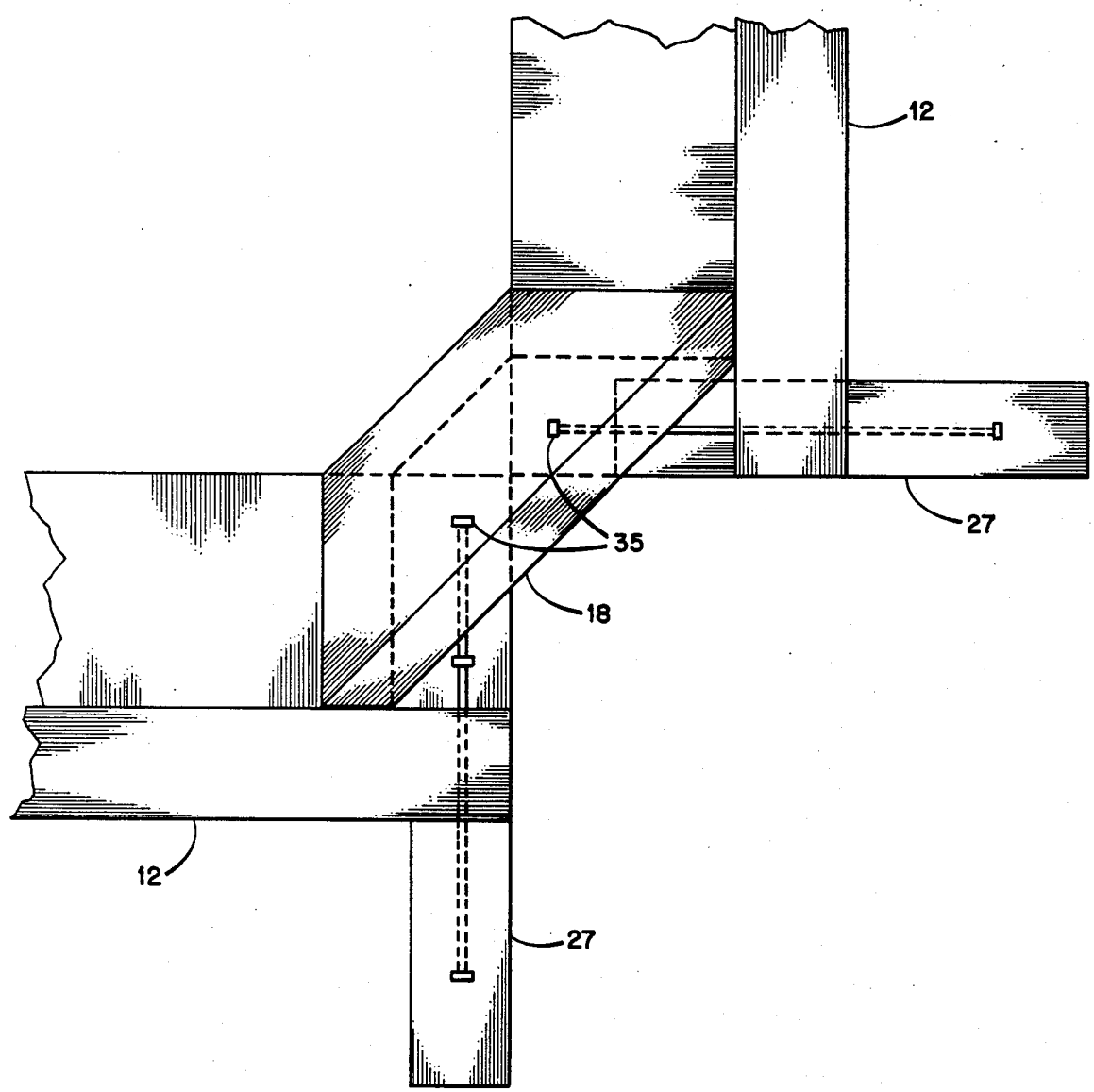
FIG. 8 is a top plan view of a corner detail of the system of FIG. 1

In one configuration that has been used, corner panels 18 are made 8 feet high, 20 inches wide at the bottom and 48 inches wide at the top. While corner panels 18 can be made with surface cavities as wall panels 12, they can also be made in solid panels as depicted having a thickness of 4 inches and ferrous reinforcing rods 34. Corner panel 18 is depicted in FIG. 7 as it would appear looking at the corner from the inside of the pollutant storage system. Thus angled side walls of corner panel 18 are depicted by dashed lines 35 and 36. The angled side walls are designed to permit corner panel 18 to fit into a corner with its side walls lying flush against adjacent wall panels 12 as depicted in FIG. 8.

In construction of the pollutant storage system, one preferred method is to position the A-frame supports 17 and mounting panels 12 to supports 17 as the supports are positioned. Panels 12 are preferably secured to A-frame supports 27 with the surface having cavities facing the A-frame and bolts 39 passing through both wall panel 12 and A-frame 27. After all the A-frame supports 27 and wall panel units 12 are installed, corner panel units 18 are secured by fastenings connected only to the adjacent wall panels 12 or by bolts or pins 35 (FIG. 8) which may pass through wall panels 12 and into the adjacent A-frame supports 27 at junctures 36 (FIG. 1) of adjacent wall panels 12. Wall panels 12 are positioned to overlap A-frame supports 27 by only ½ the width of the respective A-frame support 27 and then are secured in place by fastenings such as bolts 37 (FIG. 5).

Figure 10:
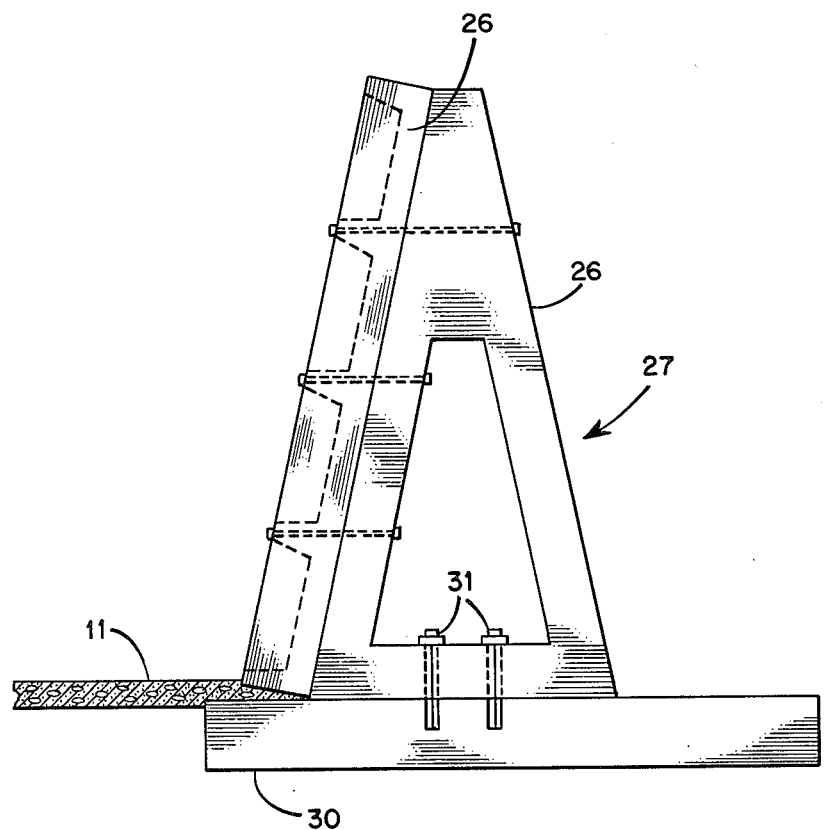
FIG. 10 is a side elevation of an A-frame support with panel unit attached for use in the back filled section of FIG. 9.

Floor area 11 may then be paved so that the paving, for example concrete as depicted in FIG. 10, covers the inside end of footing 30 of each A-frame 27 and provides a seal along the bottom edges of wall panels 12 and 18.

The outside of wall panels 12 and corner panels 18 is preferably back filled to a height of about 4 feet for additional strength and resistance to affects of frost.

Figure 9:
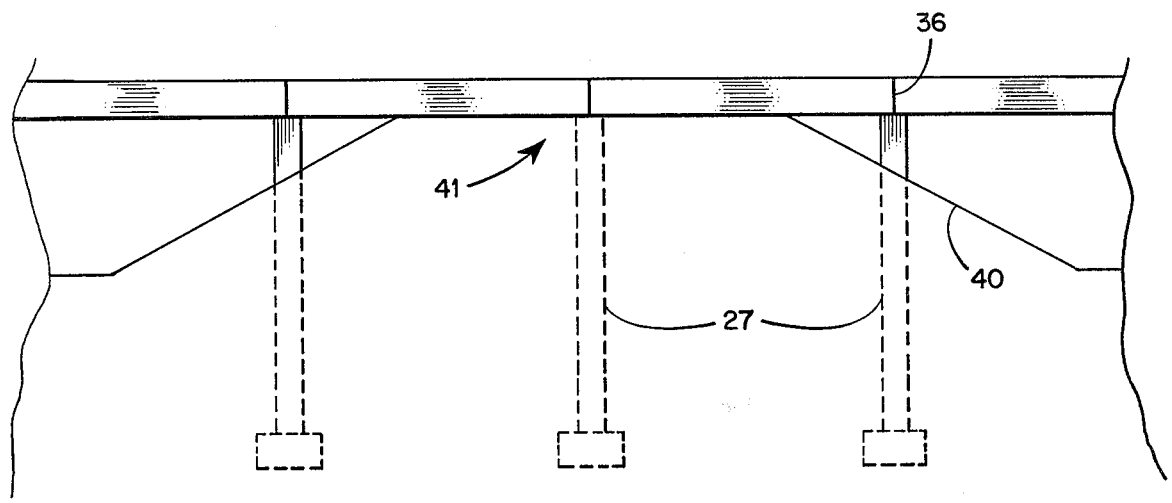
FIG. 9 is a top plan detail taken along 9—9 of FIG. 1.

Referring now to FIGS. 9 and 10, in order to provide liquid or a semi-liquid storage it has been found satisfactory to back fill a portion 10 feet or more in width to the full height of wall panels 12. In FIG. 9, contour 40 indicates where the back fill is provided up to a level higher than A-frame units 27 to provide an access area 41 over a section at the top of wall panels 12. Wall panels 12 across access area 41 are preferably reversed so that their solid portions 26 lie flush against A-frames 27. This provides greater strength for withstanding the weight of vehicles mounting the back fill area to reach access area 41.

It will be seen that a pollutant storage system according to the invention can be designed to function interchangeably for solid or liquid fill. The back fill area for liquid access can be provided and opening 14 may be provided with a removable panel. Other materials than precast concrete can be used for the panels and supports including various metals and plastics. Thus it is the intent to cover the invention as set forth in the following claims without limitations to the specifics of the embodiments described.

I claim:

1. A polygonal pollutant storage system comprising:
   (a) a paved floor;
   (b) a plurality of precast reinforced concrete wallpanels enclosing said floor, each precast panel having a pattern of surface cavities reducing its mass;
   (c) a plurality of precast A-frame supports installed exterior to and perpendicular to said wall panels for structural support whereby each of said panels angles so that the perimeter of the system is smaller at the floor level than at the top of the wall panels; and,
   (d) a trapezoidal panel at each corner having angled sidewalls to mate flushly with the inner surfaces of adjacent wall panels from said floor to the top of said wall panels with the whole of each sidewall surface of said trapezoidal panel bearing against said inner surfaces of adjacent wall panels, said inner surfaces being those surfaces facing the interior of said storage system.

2. A pollutant storage system according to claim 1 wherein said A-frame supports are mounted on elongated footings extending below expectable frost levels.

3. A pollutant storage system according to claim 1 wherein said A-frame supports have footings extending into and embedded in said paved floor.

4. A pollutant storage system according to claim 1 wherein one of said A-frame supports is positioned at each junction of said concrete panels.

5. A pollutant storage system according to claim 1 wherein said panels are fastened to said A-frame supports and each A-frame support is fastened to a footing.

6. A pollutant storage system according to claim 1 further comprising an apron extending outward from said floor at an open wall section for access purposes.

7. A polygonal pollutant storage system according to claim 1 wherein both said wall panels and said trapezoidal panels are bolted to said A-frame supports.

8. A pollutant storage system according to claim 1 wherein said wall panels are reinforced by ferrous rods near land apexes of the cavity patterns.

* * * * *